US012723710B2

(12) United States Patent
Zanni

(10) Patent No.: US 12,723,710 B2
(45) Date of Patent: Sep. 1, 2026

(54) VERTICAL SUPPORT ARRANGEMENT FOR AN OPTICAL SYSTEM

(71) Applicant: Wisconsin Alumni Research Foundation, Madison, WI (US)

(72) Inventor: Martin Zanni, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 185 days.

(21) Appl. No.: 18/409,061

(22) Filed: Jan. 10, 2024

(65) Prior Publication Data

US 2025/0224075 A1 Jul. 10, 2025

(51) Int. Cl.
*F16M 13/02* (2006.01)
*B25H 1/16* (2006.01)

(52) U.S. Cl.
CPC ............. *F16M 13/022* (2013.01); *B25H 1/16* (2013.01)

(58) Field of Classification Search
CPC ........ F16M 13/022; F16M 11/18; B25H 1/16; A47B 2005/003; A47B 7/02; A47B 3/08
See application file for complete search history.

(56) References Cited

U.S. PATENT DOCUMENTS 3,204,689 A * 9/1965 Howell ................. E04B 2/7444 160/135
4,099,469 A * 7/1978 Sahli ........................ A47B 3/00 312/231
5,337,657 A * 8/1994 Diffrient ................ A47B 21/06 108/115
5,505,318 A * 4/1996 Goff ....................... A47B 46/00 211/90.03
5,749,480 A * 5/1998 Wood ..................... A47B 57/04 248/242
6,491,268 B1 * 12/2002 Channer ............ A47B 21/0314 248/176.1
6,796,536 B1 * 9/2004 Sevier, IV ........... A47B 23/046 248/924
7,739,962 B2 * 6/2010 Zhu .......................... G02B 7/00 428/116

(Continued)

OTHER PUBLICATIONS

TMC / AMETEK "Vacuum Compatible Optical Table | 730 Series", accessed Jan. 8, 2024; pp. 1-6. https://www.techmfg.com/products/cleantopopticaltopsandsupports/cleantop-optical-table-speciality-series/vacuum-compatible-730-series.

(Continued)

*Primary Examiner* — Ko H Chan
(74) *Attorney, Agent, or Firm* — Boyle Fredrickson, S.C.

(57) ABSTRACT

A support arrangement positions an optical system in a generally vertical plane. The support arrangement may include an optical support panel that can be arranged in an upright position. At least one mounting surface of the optical support panel may be arranged vertically so that its entire surface area is within an arms-length distance or freely accessible to a standing or seated user. An unobstructed zone may be defined immediately adjacent to the mounting surface(s), which is substantially devoid of any supporting or other structures as mechanical barriers to the vertical mounting surface(s). The optical support panel may be rotationally and/or height adjustably mounted within a frame. A control system may facilitate remote height and/or angular position adjustments of the optical support panel.

7 Claims, 8 Drawing Sheets

(56) References Cited

U.S. PATENT DOCUMENTS

| | | | | |
|---|---|---|---|---|
| 7,891,630 | B2 * | 2/2011 | Lipman | B60R 11/0252 248/371 |
| 8,011,627 | B2 * | 9/2011 | Andkjar | B62J 11/00 248/689 |
| 8,539,888 | B2 * | 9/2013 | Hernandez | A47B 85/06 108/115 |
| 8,539,889 | B1 * | 9/2013 | Khalaf Allah | A47B 85/06 108/115 |
| 8,590,854 | B1 * | 11/2013 | Salazar | A47C 7/705 248/500 |
| 9,591,921 | B2 * | 3/2017 | Valdivia | A47B 23/043 |
| 9,615,678 | B1 * | 4/2017 | Lindblom | A47F 5/16 |
| 9,936,825 | B1 * | 4/2018 | Lindblom | A47F 5/0087 |
| 10,595,630 | B2 * | 3/2020 | Lam | A47B 13/081 |
| 10,617,207 | B2 * | 4/2020 | Hsiao | A47B 85/06 |
| 11,266,231 | B2 | 3/2022 | Dhese et al. | |
| 11,814,839 | B2 * | 11/2023 | Colin | A47B 47/028 |
| 2008/0054145 | A1 * | 3/2008 | Lipman | B60R 11/0252 248/242 |
| 2008/0142463 | A1 * | 6/2008 | Johnson | A47B 57/20 211/187 |
| 2016/0058211 | A1 * | 3/2016 | Weinstein | A47F 5/135 211/195 |
| 2016/0324309 | A1 * | 11/2016 | Kassanoff | A47B 13/081 |
| 2017/0070052 | A1 * | 3/2017 | Fishler | H02J 3/381 |
| 2018/0226915 | A1 * | 8/2018 | Henderson | F16H 19/001 |
| 2021/0068530 | A1 * | 3/2021 | Tao | A47B 3/0913 |
| 2024/0065458 | A1 * | 2/2024 | Pryor | A47B 47/022 |

OTHER PUBLICATIONS

Thorlabs “Right-Angle Mounting Adapters”, accessed Jan. 8, 2024; 1994-2024 Thorlabs, Inc., pp. 1-12. https://www.thorlabs.com/newgrouppage9.cfm?objectgroup_id=223.

* cited by examiner 126
128
124
UP
DOWN
80
82
96
94
120
122
112
12
112
110

VERTICAL SUPPORT ARRANGEMENT FOR AN OPTICAL SYSTEM

STATEMENT REGARDING FEDERALLY SPONSORED RESEARCH OR DEVELOPMENT

This invention was made with government support under 2314378 awarded by the National Science Foundation. The government has certain rights in the invention.

CROSS REFERENCE TO RELATED APPLICATION

--

BACKGROUND OF THE INVENTION

The present invention relates to optical systems and, in particular, to support arrangements or support devices such as optical tables for supporting optical components or devices within optical systems.

Laser-based and other optical systems used in industry or academia to conduct, for example, research experiments require precisely and accurately aligned optical devices. Numerous mounting systems or support devices have been developed to facilitate mounting optical devices in proper alignment with each other.

An example of an optical system support device is an optical table. Optical tables can support large and complicated optical systems and may provide thermal stability and isolation from vibration or other external influences. Complex optical systems may include, for example, dozens or hundreds of optical devices, entire instruments, and/or entire laser systems, which can occupy a substantial amount of space.

In order to provide the required space-occupying characteristics of large and/or complex optical systems, optical tables can have correspondingly large dimensions. Many optical tables have support surfaces with large surface areas of between twenty-four and seventy-two square feet, with typical width and length dimensions of, for example, four-feet wide and between six-feet and twelve-feet long. Some optical tables are substantially larger, with support surface areas of at least about one hundred twenty square feet, such as those with respective width and length dimensions of six-feet wide and twenty-feet long.

However, the large dimensions of optical tables can present numerous challenges while using the optical systems. These challenges can be frustrating to optical system users that have to spend long periods of time, for example, hours per day, reaching across optical tables and can be particularly frustrating to wheelchair users.

One example is that optical tables typically have fixed heights, which may not be appropriate for all users. An optical table's height is determined by fixed-height dimensions of various leg-like components, such as support posts, vibration isolators, and spacers. Changing an optical table's height typically requires substituting those leg-like components for other ones with different heights, which is often impractical.

As another example, an optical table's width dimension can make the table ergonomically challenging for many users. Many optical system users are unable to reach across an optical table's full width. Optical system users that are also wheelchair users can experience even greater difficulties reaching across an optical table's width, with large portions of the optical table being wholly inaccessible to some. Even users that are able to reach across the full width of an optical table may have to stretch or strain in order to do so, which can be uncomfortable and/or fatiguing.

Other examples of dimension-related challenges relate to the space within the optical table's use environment. An optical table can occupy a substantial amount of a lab's floorspace. This potentially presents an obstacle(s) to moving items or people through the lab.

Some efforts have been made to address various ones of these challenges. However, many of these efforts complicate other challenges or present new ones. In one example, efforts have been made to vertically mount optical breadboards to extend upwardly from optical tables' support surfaces with fixed brackets. However, an optical table that has a positionally fixed upright optical breadboard has the same footprint or occupies the same amount of floorspace within a lab as one without it. The optical table, itself, in these configurations presents an obstacle or obstruction that a user must reach across and/or lean over to access the breadboard. A positionally fixed upright optical breadboard presents a mechanical barrier that blocks access to portions of the optical table behind it and its upper portions can be at heights that are difficult for users to reach.

Furthermore, it can be difficult to mount and unmount optical devices to and from positionally fixed upright optical breadboards on top of optical tables. Since users are prevented from standing or sitting immediately next to such a breadboard extension from by the space-obstructing optical table, users must simultaneously reach across or lean over the optical table, hold the optical device against the optical breadboard, and tightening or loosening its mounting fasteners. Large or heavy optical devices may require more than one user to perform these tasks due to these challenges.

SUMMARY OF THE INVENTION

The present invention provides a support arrangement for an optical system with an optical support panel, such as an optical table or optical breadboard, provided in an upright position while facilitating substantially free accessibility to the upright panel. The optical support panel is configured to hold optical devices of the optical system in a vertical arrangement, for example, in a common vertical plane, when in the upright position. This provides full access to an entire mounting surface(s) of the optical support panel by allowing users to position themselves immediately next to the optical support panel's mounting surface.

According to one aspect of the invention, when the optical support panel is in the upright position, an unobstructed zone may be defined next to it. The unobstructed zone may be defined by a column of open space that nests against the upright optical support panel, which does not have any, for example, protruding support structures that would prevent users from standing or sitting immediately next to or against the optical support panel or the optical devices mounted to it. The optical support panel may include a pair of primary walls that are parallel to each other define planar mounting surfaces that are oriented in parallel vertical planes when the panel is in the upright position.

It is thus a feature of at least one embodiment of the invention to provide an optical support panel that can be arranged in an upright portion with an open space next to it to facilitate access to the entire surface area of its mounting surface(s).

According to another aspect of the invention, the upright optical support panel presents a pair of oppositely facing upright mounting surfaces, each of which may include an array of mounting holes. A passage or port may extend through the entire thickness of the support panel to provide a duct-like connection between the sides or mounting surfaces, through which light may be transmitted.

It is thus a feature of at least one embodiment of the invention to allow both sides of an upright optical support panel to provide a pair of upright mounting surfaces that may collectively support optical devices of single optical system. This doubles the upright optical support panel's effective usable surface area when compared to a horizontal optical table since system components may be mounted on both sides and still interact with each other through the port(s). For example, when comparing a horizontal optical table and a double-sided-mounting upright optical support panel with the same width (height for the upright configuration) dimensions, an equivalent mounting surface area of the double-sided-mounting upright optical support panel is achieved with one-half of the length dimension as the horizontal optical table with its single-upper mounting surface.

It is thus a feature of at least one embodiment of the invention to provide substantial space savings with an upright optical support panel that may be a fraction of the length of a conventional optical table with an equivalent total mounting surface area by implementing multiple mounting surfaces that can support optical devices that may interact with each other even though they are supported by the different surfaces.

According to another aspect of the invention, the optical support panel may be mounted to a frame that is supported either by an underlying floor surface or an overlying ceiling structure. The frame may include various accessory components such as vibration dampers or other isolation devices. The isolation devices may be arranged between the frame and its underlying or overlying support structure, between components or segments of the frame itself, or between the frame and the panel.

It is thus a feature of at least one embodiment of the invention to provide an optical support panel in an upright position that is isolated from various external forces or influences, which may improve operational stability.

According to another aspect of the invention, the frame facilitates movement of the optical support panel. The frame itself may be readily movable. A set of casters or other movement devices may be mounted to various supports of the frame.

It is thus a feature of at least one embodiment of the invention to facilitate moving an optical support panel within a lab space while avoiding disassembly/reassembly procedures, which may simplify rearranging a lab or temporarily storing the optical support panel.

According to another aspect of the invention, the optical support panel may be movable with respect to at least portions of the frame. The support arrangement may include a height adjuster and/or a rotation adjuster to respectively change the height(s) and rotational position(s) of the panel. The height adjuster may include a height drive that can be manually powered by the user or powered by way of a prime mover, such as an electric motor, which may move the optical support panel between minimum and maximum height positions. Similarly, the rotation adjuster may include a rotation drive that can be manually powered by the user or powered by way of a prime mover, such as an electric motor, which may move the optical support panel between the upright position and a sideways position in which its mounting surface(s) is in a substantially horizontal plane.

It is thus a feature of at least one embodiment of the invention to allow for height and/or rotational or angular adjustments of the optical support panel, which may enhance accessibility to the optical support panel by raising/lowering it or rotating it between vertical and horizontal positions to present a user's desired position and orientation of various segments of the panel for particular tasks.

According to another aspect of the invention, the height and/or rotational adjustments to the optical support arrangement can be commanded through a remote user device. The remote user device may be implemented as a smartphone or other handheld device that is configured to communicate, typically wirelessly, with a control system that controls the height drive and/or rotation drive.

It is thus a feature of at least one embodiment of the invention to provide remote controllability of the optical support panel's repositioning, which may expedite panel repositioning by allowing a user to evaluation the panel's position from different perspectives than would be permissible with inputs directly at the component(s).

According to another aspect of the invention, a rotation prevention device may be arranged within a torque transmission path between the rotation drive and the optical support panel. The rotation prevention device may be, for example, a brake, a pin, or a detent that selectively interacts with a panel support component that drives its rotation to selectively lock or unlock and correspondingly prevent or permit the panel's rotation.

It is thus a feature of at least one embodiment of the invention to selectively fix the optical support panel in a desired position, which may present and hold certain segments of the panel in a particularly accessible location for a corresponding task.

These particular objects and advantages may apply to only some embodiments falling within the claims and thus do not define the scope of the invention.

DETAILED DESCRIPTION OF THE PREFERRED EMBODIMENT

Figure 1:
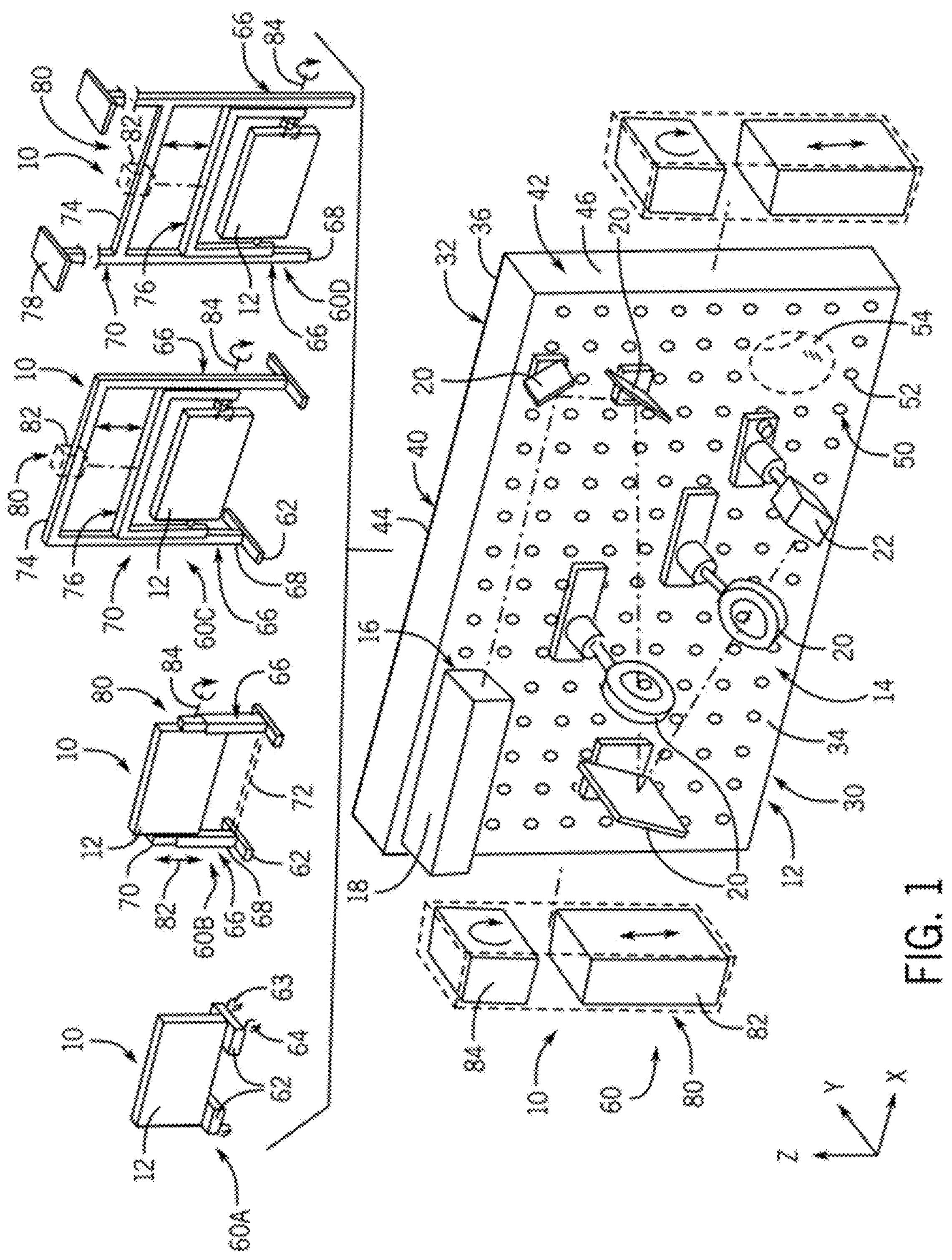
FIG. 1 is a partially schematic isometric view of a support arrangement including various frames in accordance with an aspect of the invention.

Referring to FIG. 1, a support arrangement 10 includes an optical support panel 12 that is shown supporting an optical system 14. Optical system 14 includes multiple optical devices 16 such as, for example, various light sources 18, optics 20, and detectors 22. The light sources 18 may include various lasers, lamps, LEDs (light emitting diodes), SLDs (super-luminescent diodes) or systems implementing those components. Optics 20 may include mirrors, lenses, beam-splitters, windows and wedges, prisms, mirrors, or the like. Detection devices or detectors 22 may include, for example, various sensors, analysis devices, and cameras. Regardless, optical system's 14 optical devices 16 are supported, typically removably supported, by the optical support panel 12.

Still referring to FIG. 1, optical support panel 12 has a body defined by multiple walls that are connected to each other and present outwardly facing surfaces. These include primary or main walls 30, 32 which are shown here presenting major surfaces or the optical support panel's largest surfaces as planar mounting surfaces 34, 36. The side and end walls 40, 42 extend perpendicularly between and connect respective side and end edges of the main walls 30, 32 while presenting corresponding side and end surfaces 44, 46. A gridwork or array 50 of mounting holes 52 is shown at the main wall's 30 mounting surface 34 and is typically provided at other surfaces of the optical support panel 12, such as main wall's 32 mounting surface 36. The mounting holes 52 may be threaded bores that receive fasteners for securing the optical device 16 to the respective mounting surface.

Still referring to FIG. 1, the optical support panel 12 may support more than one optical system 14. In one example, each of the main walls 30, 32 may support an optical system 14 at the opposing sides of the optical support panel 12. In some implementations, a singe optical system 14 has various ones of its optical devices 16 supported by different surfaces of the optical support panel 12. For example, some of the optical system's 14 optical devices 16 may be supported by main wall's 30 mounting surface 34 while other optical devices 16 may be supported by different segments of the optical support panel 12, such as main wall's 32 mounting surface 36 and/or the various surfaces side or end surfaces 44, 46 (only one shown) of the side and end walls 40, 42 (only one shown). Various passages or ports may extend into or through different segments of the optical support panel 12 to facilitate, for example, light transmission through those segments. A passage or port 54 is shown here extending through an entire thickness of the optical support panel 12, which allows light to be transmitted through the optical support panel 12, from an optical device(s) 16 on one side to an optical device 16 on the other side. Although optical support panel 12 is represented here with one particular optical table-type configuration, it is understood that it may instead be implemented with, for example, other relative dimensions or dimensional ratios, or may have non-table configurations such as those of optical breadboards and/or other forms that provide at least one mounting surface that is configured to support optical system 14.

Still referring to FIG. 1, frame 60 supports the optical support panel 12 and therefore also the optical system 14. At least at times and as shown, frame 60 supports the optical support panel 12 in an upright position. This correspondingly arranges the main walls 30, 32 and their mounting surfaces 34, 36 vertically or in a generally vertical plane(s). When the optical support panel 12 is in the upright position, the optical devices 16 extend generally horizontally from their respective mounting surfaces 34, 36, in a cantilevered manner.

Various schematic representations of different implementations of frame 60 are shown as a set of frames above the bracket toward the top of FIG. 1. Frame 60A is shown with support feet 62 engaging a lower wall of the optical support panel 12, supporting the optical support panel 12 at its ends. The support feet 62 may include, for example, vibration dampers including various damping weights and/or struts or other isolator devices 63 to dampen vibrations in the vertical and/or horizontal dimensions or otherwise reduce transmission of forces from the underlying ground or floor surface into the optical support panel 12. It is further contemplated that such isolator device(s) 63 may be arranged at other locations within frame 60 or elsewhere within the support arrangement 10, such as immediately between the support arrangement 10 and underlying floor surfaces or overlying ceiling structures, or between various components or segments of the frame 60 itself or otherwise between the optical support panel 12 and other components or subassemblies of the support arrangement 10, and/or implemented as internal features or devices within the optical support panel 12 itself.

Still referring to FIG. 1, frame 60A is also shown with components configured for moving the optical support panel 12 to different locations within a lab-space or other use environment, represented here as casters 64 that are mounted below or to bottom surfaces of feet 62. Frame 60B is shown with upright tubular members or posts 66. Lower ends 68 of posts 66 are connected to upper surfaces of feet 62 and upper ends 70 are arranged outwardly of the ends of optical support panel 12 for supporting it. At least one cross-member, shown as a lower cross-member 72, may extend between and connect the posts 66 or feet 62 to each other, below the optical support panel 12. Frame 60C also engages an underlying floor surface for supporting the optical support panel 12 like frames 60A, 60B, but further includes an upper cross member 74 that connects the upper ends 70 of posts 66 to each other in a gantry-like overhead manner. Subframe 76 is shown within frame 60C, captured between the uprights 66 and suspended below the upper cross member 74, supporting the optical support panel 12. Frame 60D is also shown with a subframe 76 captured between the uprights 66 and suspended below the upper cross member 74. Unlike the other frames 60A, 60B, 60C, frame 60D is shown configured for overhead mounting. Upper mounting pads 78 are shown connected to upper ends 70 of posts 66 and are configured to be attached to a ceiling structure to suspend the optical support panel 12 and frame 60D.

Still referring to FIG. 1, a panel position control system 80 is configured to change the position and/or orientation of optical support panel 12 within frame 60. Panel position control system 80 includes height adjuster 82 and rotation adjuster 84. Height adjuster 82 is configured to selectively raise and lower to optical support panel 12, to move into different heights between a minimum height position and a maximum height position to a desired height position. Rotation adjuster 82 is configured to move the optical support panel 12 to different angular positions, rotationally moving it about a horizontal rotational axis to a desired angular orientation.

Figure 2:
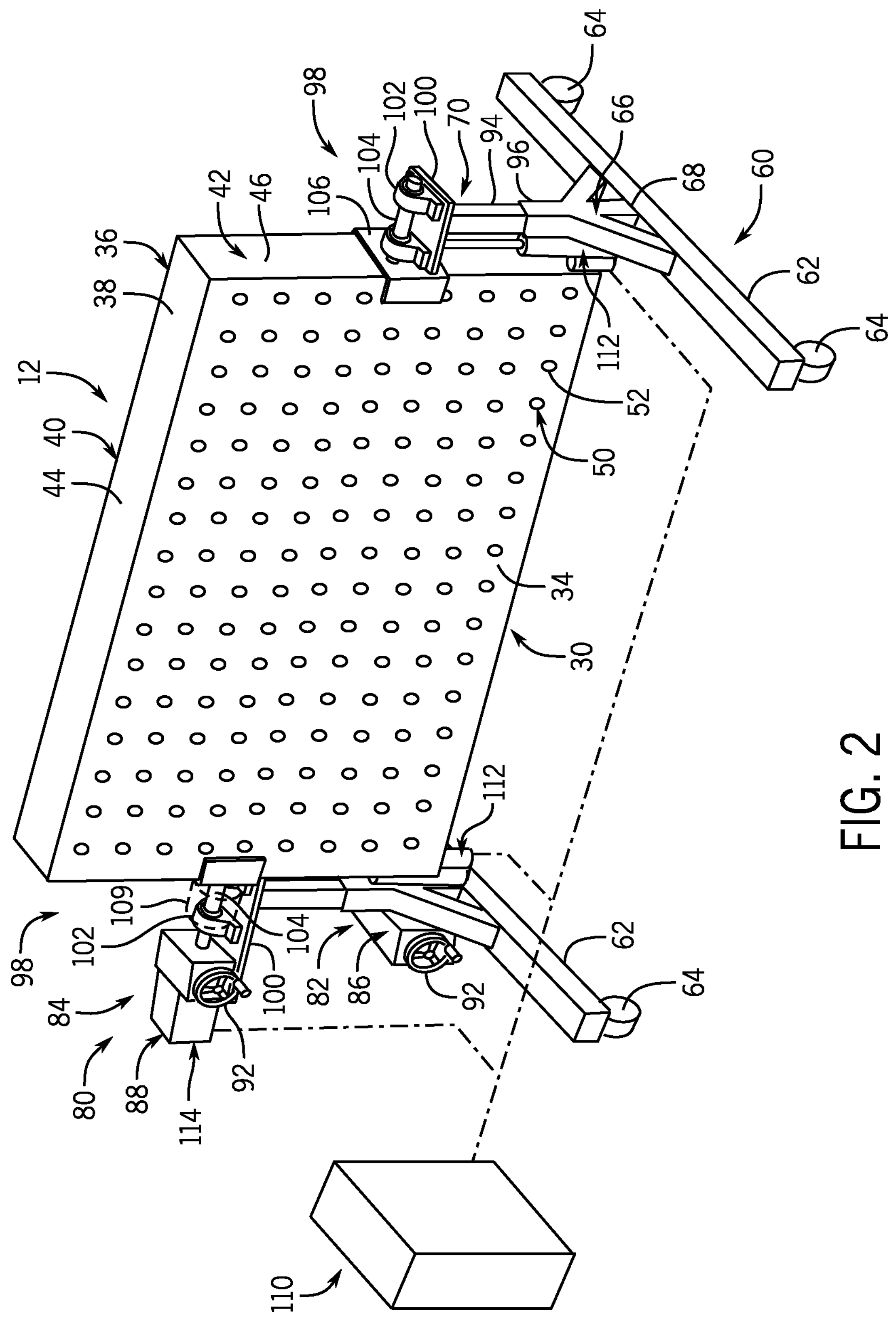
FIG. 2 is a partially schematic isometric view of a variant of the support arrangement of FIG. 1.

Referring now to FIG. 2, height adjuster 82 and rotation adjuster 84 of position control system 80 respectively include height drive 86 and rotation drive 88. Each of the height and rotation drives 86, 88 may be configured for manually moving the optical support panel 12 by way of a manual input device. A manual input device is represented here as knob 92 that can be rotated to transmit torque through, for example, a geartrain that adjusts the height or angular position of the optical support panel 12. A knob 92 at height adjuster 82 may operate a rack-and-pinion type geartrain to extend or retract telescoping segments of post 66, shown as upper post segment 94 telescopically mounted within a longitudinal opening of a lower post segment 96.

Still referring to FIG. 2, the knob 92 at rotation adjuster 84 may operate a pinion or bevel gear type geartrain to force rotation of optical support panel 12. Optical support panel 12 is shown here rotationally mounted from its opposite ends to the upper post segments 94 by a pair of panel mounts 98. Each panel mount 98 includes plate 100 that is connected to and extends perpendicularly with respect to the upper end of upper post segment 94. Bearings 102 are shown as a pair of bearing blocks mounted to each plate 100. Support shaft 104 extends through and is rotationally supported by the bearings 102. An inner end of support shaft 104 is connected to bracket 106, which provides the connection interface to optical support panel 12. Bracket 106 is shown here with a generally C-shaped profile when viewed from a top plan view, to engage both of the opposing main walls 30, 32 as well as the end wall(s) 42.

Still referring to FIG. 2, the angular position of optical support panel 12 may be selectively fixed or held or its rotation may be stopped by way of a fixing or holding device, represented as rotation prevention device 109. Rotation prevention device 109 may be implemented as or include, for example, a pin, detent, or brake that selectively engages a component that rotates in unison with optical support panel 12, such as support shaft 104.

Still referring to FIG. 2, in addition to and/or instead of manual adjustability, the height drive 86 and/or rotation drive 88 of position control system 80 may include a prime mover(s) in communication with control system 90 that is configured for controlling the prime mover(s) to facilitate the position or orientation adjustments. Control system 110 may include, for example, a computer which may be an industrial computer or, for example, a PLC (programmable logic controller), along with corresponding software and suitable memory for storing such software and hardware including interconnecting conductors for power and signal transmission between components of the position control system 80. The computer(s) of control system 110 executes various stored programs while receiving inputs from and sending commands to various components of position control system 80 to provide controls that correspond to (re) positioning the optical support panel 12. Height drive 86 may be implemented as a linear actuator 112, shown here as a pair of linear actuators 112 with one associated with each post 66. Each linear actuator 112 may have an electric motor that can be selectively energized through control system 110 to adjust the height or vertical position of optical support panel 12. Rotation drive 88 may be implemented as a motor drive 114, shown here as a single motor drive 114 may be implemented as, for example, a servo drive or other drive system that incorporates an electric motor that can be selectively energized through control system 110 to adjust the angular position or orientation of optical support panel 12.

Figure 3:
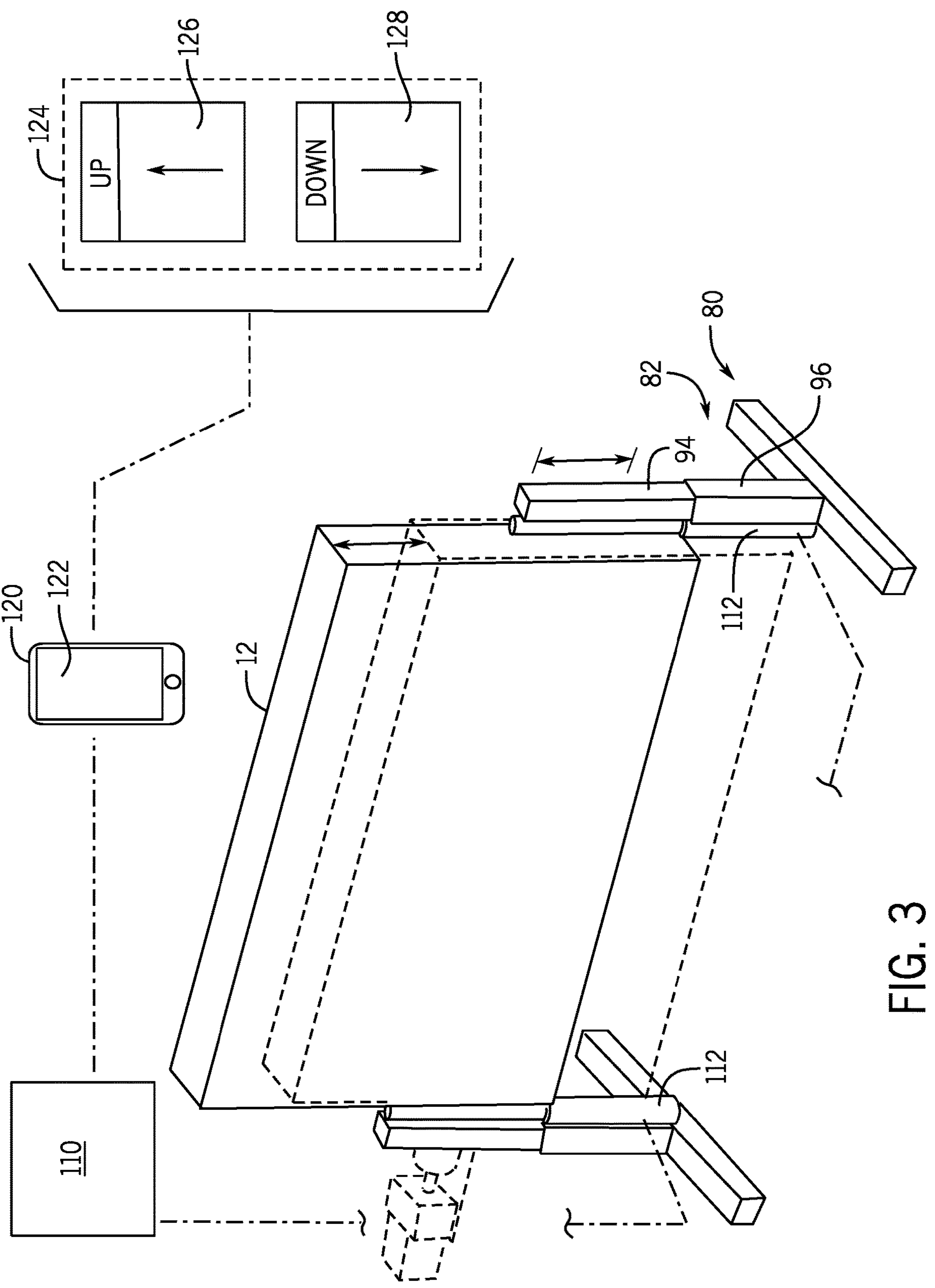
FIG. 3 is a partially schematic isometric view of a variant of the support arrangement of FIG. 1 representing a height adjustment procedure.
Figure 4:
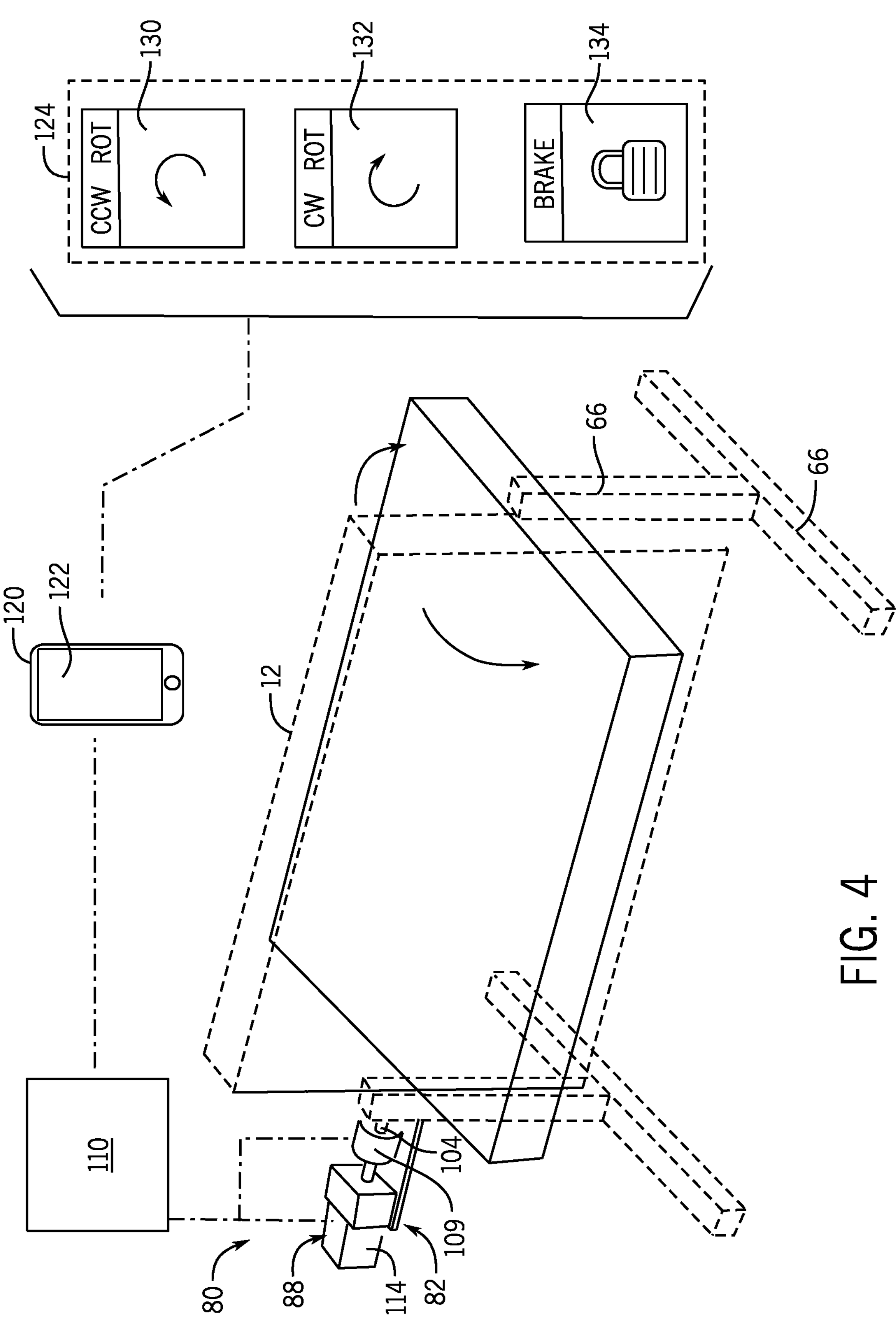
FIG. 4 is a partially schematic isometric view of a variant of the support arrangement of FIG. 1 representing a rotation or angular adjustment procedure.

Referring now generally to FIGS. 3 and 4, control system 110 may be configured to facilitate remote adjustments of the height or vertical position and angular or rotational position of optical support panel 12. A user device 120, shown here as a handheld device such as a smart phone, defines an HMI (human machine interface) that remotely and typically wirelessly communicates with cooperating components of control system 110 to receive user inputs or instructions and transmit them to control system 110. The wireless communications may be done by way of, for example, Wi-Fi or Bluetooth® communication protocols. User device 120 typically includes a touchscreen 122 that may present a GUI (graphical user interface) 124. Control system 110 receives the instructions from user device 120 and issues corresponding commands to position control system 80 effectuate corresponding movement of optical support panel 12.

Referring now to FIG. 3, a height adjustment procedure of optical support panel 12 is shown. GUI 124 is shown presenting an up-button 126 and a down-button 128 on touchscreen 122. A user may press up-button 126 to provide a height-increase instruction to control system 110. Control system 110 receives the height-increase instruction and delivers a corresponding command to energize the motor(s) of linear actuator(s) 112 and move the optical support panel 12 upwardly a corresponding amount. A user presses down-button 128 to drive the optical support panel 12 in the opposite direction and lower it by the control system 110 energizing the motor to rotate it in the opposite direction. A maximum height is represented by the position of optical support panel 12 in solid-outline and a minimum height is represented by the position of the optical support panel 12 in dashed-outline.

Referring now to FIG. 4, an angular or rotational adjustment procedure of optical support panel 12 is shown. GUI 124 is shown presenting a counterclockwise-button 130, a clockwise-button 132, and a hold or brake-button 134. A user may press the counterclockwise-button 130 to provide a corresponding counterclockwise rotation instruction to control system 110. Control system 110 receives the counterclockwise rotation instruction and delivers a corresponding command to energize the motor(s) of motor drive 114 to rotate its output shaft in a direction that corresponds to a counterclockwise rotation of optical support panel 12 about a horizontal axis of rotation. A user presses clockwise button 132 to drive the optical support panel 12 in a clockwise direction by the control system 110 energizing the motor to rotate the motor drive's 114 output shaft in a direction that corresponds to a clockwise rotation of optical support panel 12 about the horizontal axis of rotation. This allows a user to rotate the optical support panel 12 between upright and sideways positions. The vertical or upright position of optical support panel 12 is represented by its position shown in dashed-outline. The sideways or horizontal position of optical support panel 12 is represented by its position shown in solid-outline. When a user presses brake button 134 to lock the optical support panel 12 in its angular position, control system 110 issues a command to lock the optical support panel. This may include energizing an actuator within rotation prevention device 109 to engage shaft 104 with a braking element or the like to prevent its rotation.

Referring again generally to FIGS. 3 and 4, it is understood that GUI 124 may present other virtual buttons to control the various movements of optical support panel 12 or those shown can be programmed to provide different commands. For example, whereas brake switch 134 may function similar to a two-position switch that toggles between on and off states with alternative presses, the height and angular position controlling switches may function as momentary switches that that only drive movement of the optical support panel 12 while the user is pressing the respective button. The various virtual buttons may also provide single-touch driving of optical support panel 12 to defined positions. This could include a single-touch of a button to drive the optical support panel 12 from its upright position to its sideways position and vice versa. As a height adjustment example, a single touch of a virtual button could drive the optical support panel 12 from a maximum height position to a minimum height position and vice versa. Predefined or redefinable incremental movements can also be achieved through single-touch engagements of the GUI's 124 virtual buttons. A single-touch of a rotation button can provide rotations of 10-degree movement increments or some other discrete amount(s) of rotational movement. Likewise, a single-touch of a raise or lower button can correspondingly raise or lower the optical support panel 12 in a one-inch increments or some other discrete amount(s) of height adjustment.

Figure 5:
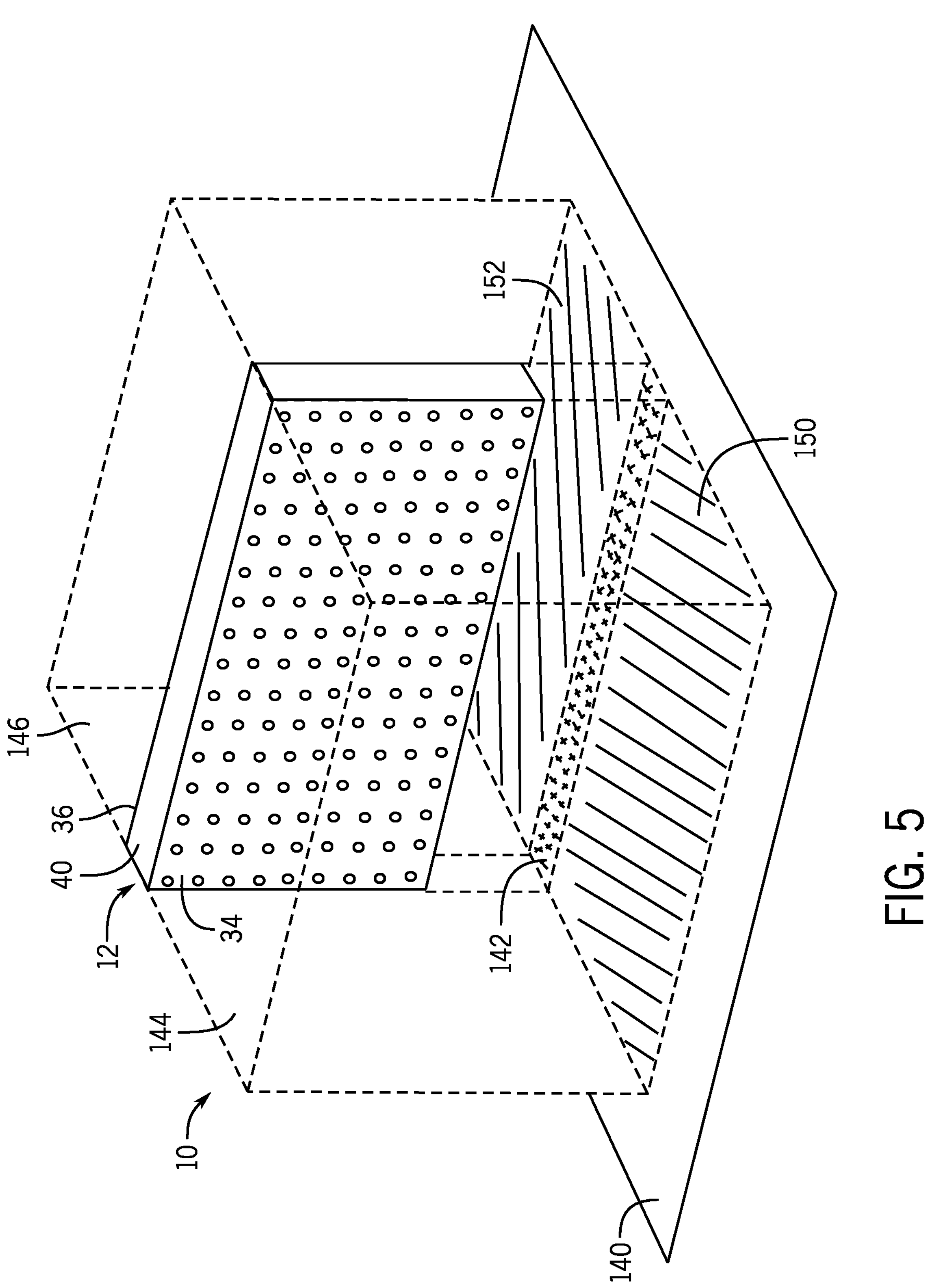
FIG. 5 is a partially schematic isometric view of a variant of the support arrangement of FIG. 1 showing various zones associated in a use-area with the optical support panel in an upright position.
Figure 6:
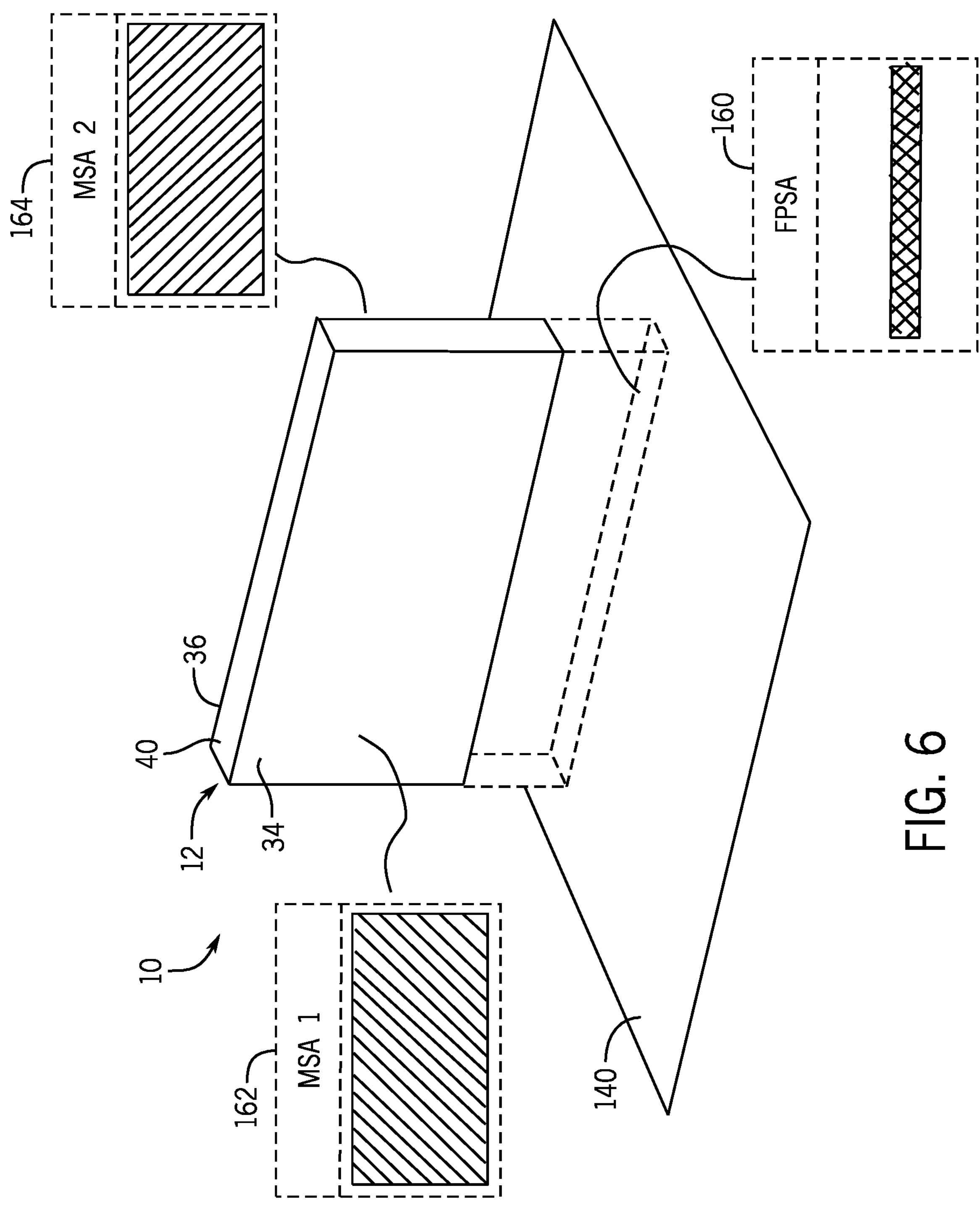
FIG. 6 is a partially schematic isometric view of a variant of the support arrangement of FIG. 1 showing various surface areas.

Referring now to FIGS. 5 and 6, regardless of the particular configuration of the panel position control system's 80 user interface, the panel position control system is configured to allow users to adjust the optical support panel's 12 position and orientation to enhance accessibility to its different segments. This may include moving the optical support panel 12 to its upright position, which provides unobstructed access to the mounting surfaces 34, 36 and allows users to stand or sit immediately against the mounting surfaces 34, 36 without having to reach horizontally across the panel. Typically, when the optical support panel 12 is in the upright position, the optical devices 16 (FIG. 1) extend further from respective mounting surface 34, 36 further than any other structure of the support arrangement 10 that is directly in from of the mounting surface 34, 36, providing free open access to the mounting surfaces, in their entireties.

Referring now to FIG. 5, when in the upright position, the optical support panel 12 projects a panel footprint area on an underlying floor surface 140, shown as panel footprint 142. Panel footprint 142 has a profile or perimeter shape and dimensions that correspond to those of side wall 40 when view from a top plan view of the optical support panel 12 in its upright position. Accordingly, panel footprint 142 has a generally rectangular perimeter shape with a width dimension that is substantially less than its length dimension. The panel footprint's 142 length dimension is typically at least four-times greater than its width dimension and may be, for example, at least ten-times greater than its width dimension.

Still referring to FIG. 5, a pair of unobstructed zones 144, 146 are defined at opposite sides of the optical support panel 12 and generally provide spaces in which users may freely stand or sit while accessing the mounting surfaces 34, 36. Unobstructed zones 144, 146 are defined by box-like or columnar open spaces juxtaposed to or immediately adjacent mounting surfaces 34, 36, respectively. Inner boundaries of the unobstructed zones 144, 146 are defined by the respective outwardly facing mounting surfaces 34, 36. Height dimensions of the unobstructed zones 144, 146 are shown corresponding to a distance between an upper edge of optical support panel 12 and the floor surface 140. Length dimensions of the unobstructed zones 144, 146 are shown corresponding to the length dimension of optical support panel 12. Width dimensions of unobstructed zones 144, 146 typically correspond to width dimension of feet 62 (FIG. 2) or how far the frame 60 (FIG. 2) extends perpendicularly away from the mounting surfaces 34, 36 for within arms-length of a user when in the panel's upright position. The lower boundaries of the unobstructed zones 144, 146 are provided by floor surface 140 and define corresponding unobstructed floor spaces 150, 152.

Referring now to FIG. 6, when optical support panel 12 is in its upright position, it occupies a relatively small amount of floor space while presents relatively large amounts of mounting surface area(s) for attaching optical components 16 (FIG. 1) to the optical support panel 12. Panel footprint 142 defines a footprint surface area (FPSA) 160. The first and second mounting surfaces 34, 36 respectively define a first mounting surface area (MSA1) 162 and a second mounting surface area (MSA2) 162. Each of the mounting surface areas 162, 164 is larger than the footprint surface area 160. Typically, each mounting surface area 162, 164 is multiple times greater than the footprint surface area 160, for example, at least about three-times greater, at least about five-times greater, or at least about ten-times greater than the footprint surface area 160. With such large vertically arranged mounting surfaces 34, 36, compared to the floor space occupied by downward projections of the system components, a corresponding fraction of an amount of floorspace can be used for providing optical systems 14 (FIG. 1) that would otherwise be required.

Figure 7:
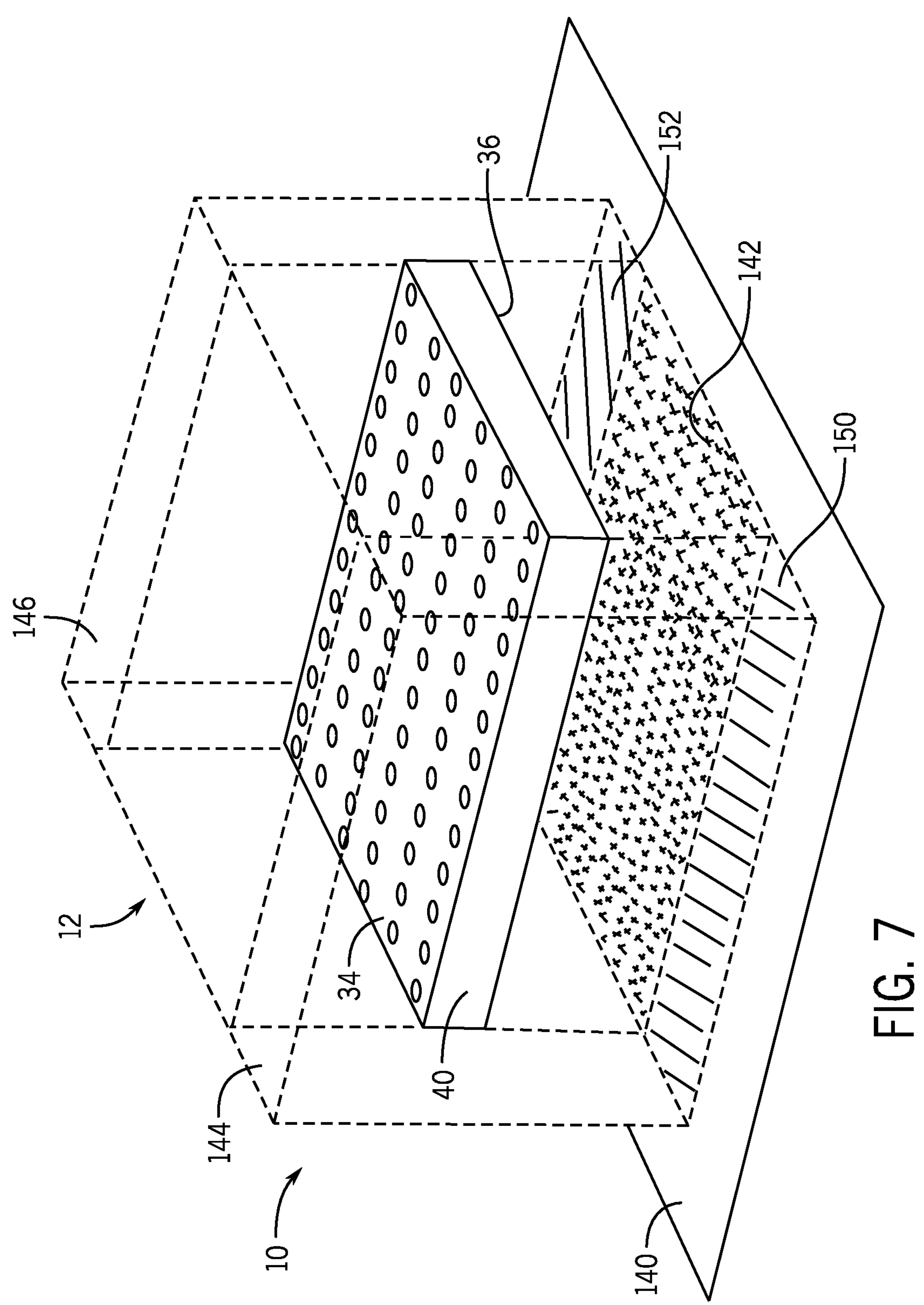
FIG. 7 is a is a partially schematic isometric view of a variant of the support arrangement of FIG. 1 showing various zones associated in a use-area with the optical support panel in a sideways position.

Referring now to FIG. 7, with background reference to FIGS. 5 and 6, the magnitude of the panel footprint surface area 160 (FIG. 6) is variable as a function of the optical support panel's 12 orientation or angular position. When in the upright position, the panel footprint surface area 160 (FIG. 6) defines a minimum value (FIG. 5) and a maximum value is defined with the optical support panel 12 is in its sideways position (FIG. 7). Accordingly, the greatest ratio of exposed usable surface area of mounting surfaces 34, 36 versus occupied floorspace or footprint surface area 160 (FIG. 6) is achieved when the optical support panel 12 is in the upright position. Referring to FIG. 6, such a ratio may correspond to a sum of the areas of the first (MSA1) and second (MSA2) mounting areas 162, 164 versus the area of the footprint surface area (FPSA) 160. In an example in which optical support panel 12 with a pair of opposing support surfaces in its sideways position defines respective width, length, and thickness dimensions of four feet, ten feet, and six inches, such a ratio is 80 square feet: 5.5 square feet.

During use, a user may adjust the height or angular position of optical support panel 12 to enhance accessibility as well as provide different positions or orientations for different tasks. For example, during a device mounting procedure, when mounting relatively lightweight optical devices 16, a user may move the panel to its upright position to access the mounting surface(s) 34, 36 from the unobstructed zone(s) 144, 146. If a particularly large or heavy optical device 16 needs to be mounted, especially toward an outer edge of the panel 12, the user may rotate the panel 12 to its sideways position to avoid manually supporting the weight of such a heavy device 16 while mounting. Then, the user may move panel 12 back to its upright position to perform a use-session of the optical system 14. Furthermore, multiple support arrangements 10 can be implemented at a single location and, when storage or minimizing floorspace is desired for storage or compact use, the panels 12 may all be moved to their upright positions and the frames 60 nested against or otherwise by positioned near each other for storage or performing the use-session in a compact manner.

Figure 8:
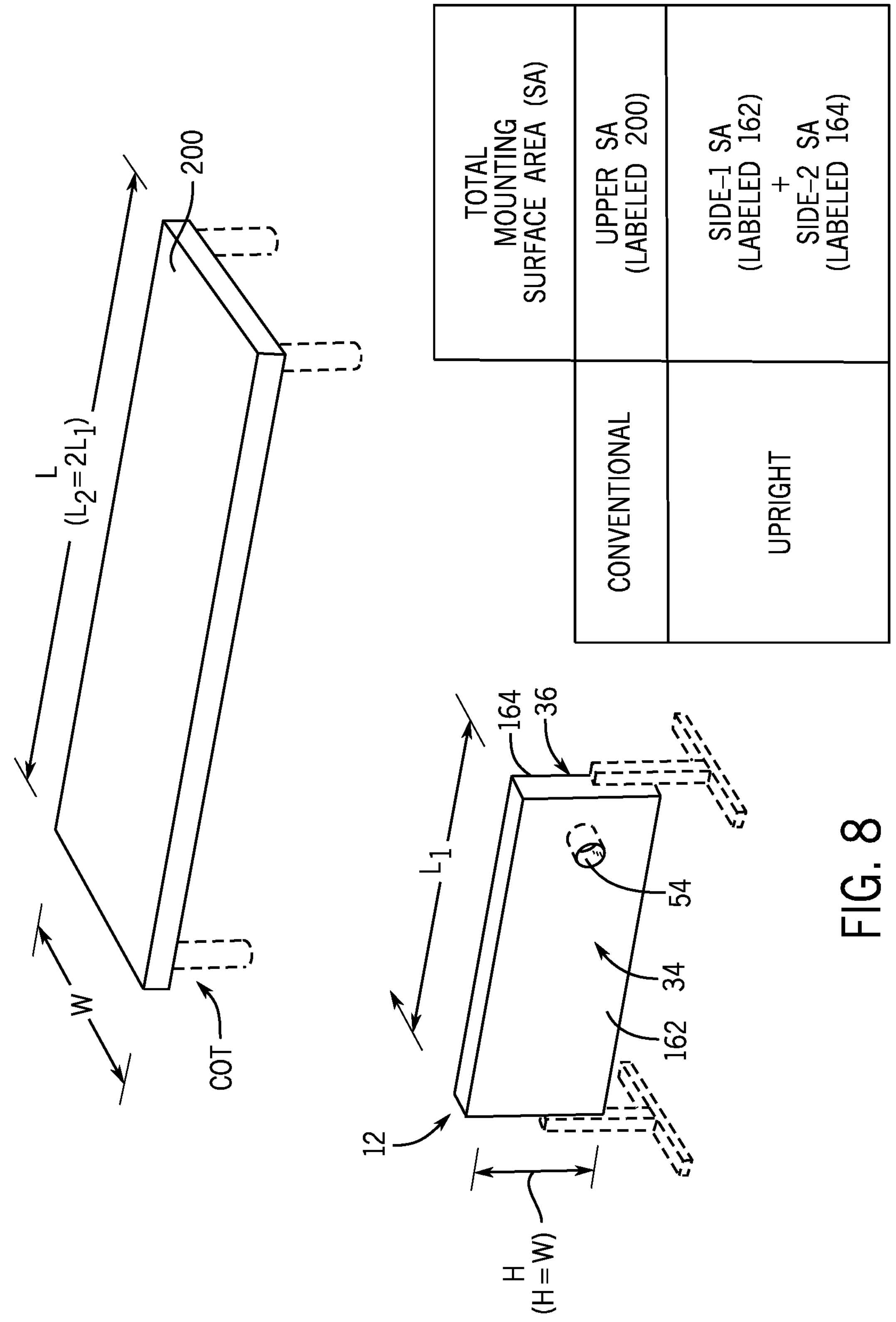
FIG. 8 is a partially schematic isometric view providing a size comparison of an upright optical support panel and a conventional optical table with equivalent total mounting surface areas.

Referring now to FIG. 8, this schematic representation shows a substantial size reduction of optical support panel 12 compared to a conventional optical table (COT) to provide an equivalent effective mounting surface area. As is typical, conventional optical table COT has a total mounting surface area that is defined by its upper surface 200. In contrast, the illustrated upright optical support panel 12 has a total mounting surface area that is the sum of its surface areas of both of its sides, such as mounting surface areas 162, 164 that are functionally joined by port(s) 54 that allows optical devices 16 (FIG. 1) mounted to both mounting surface areas 162, 164 of surfaces 34, 26 to interact with each other. As shown, if the remaining dimensions that influence mounting surface areas are the same, then the double-sided-mounting upright optical support panel 12 can provide an equivalent total mounting surface area with a length dimension that is one-half of that of conventional optical table COT. For example, upright optical support panel 12 is shown with a height dimension (H) that is the same as conventional optical table COT's width dimension (W). Upright optical support panel 12 is shown with length dimension (L1) that is one-half of the length dimension (L2) of conventional optical table COT, yet both the upright optical support table 12 and conventional optical table have the same total mounting surface area for mounting optical devices 16 (FIG. 1).

It is understood that although interactions of optical component 16 (FIG. 1) mounted to different mounting surfaces 34, 36 are primarily discussed as occurring through port 54, port 54 may instead be configured as, for example, a cutout or recess that extends in an edge(s) or side and/or end wall(s) 40, 42 (FIG. 1). Various different surface-mounted component interactions may also be provided by way of optical devices 16 (FIG. 1), such as fiber-optic devices and/or mirrors or the like, that may extend beyond a periphery of the optical support table 12 to direct the light around an edge or side and/or end wall(s) 40, 42 (FIG. 1) in a manner that allows the optical devices 16 on both mounting surfaces 34, 36 to interact with each other.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What I claim is:

1. A support arrangement for an optical system comprising:
- a frame;
- an optical support panel that defines a planar mounting surface and is supported in the frame for movement between an upright position and a sideways position, wherein;
  - the planar mounting surface is oriented in a generally vertical plane when the optical support panel is in the upright position;
  - the planar mounting surface is oriented in a generally horizontal plane when the optical support panel is in the sideways position;
  - an array of mounting holes is provided at the planar mounting surface and configured to secure at least one optical device against the planar mounting surface;
  - when the optical support panel is in the upright position, the at least one optical device extends generally horizontally outwardly from the mounting surface;
  - when the optical support panel is in the sideways position, the at least one optical device extends generally vertically upwardly from the mounting surface;
- a rotation drive that:
  - is mounted between the frame and the optical support panel;
  - is configured to selectively rotate the optical support panel between the upright and sideways positions; and
  - includes an electric motor that can be energized to rotate the optical support panel between the upright and sideways positions.

2. The support arrangement of claim 1, further comprising a rotation prevention device that defines a locked state and an unlocked state, and wherein:
- when in the locked state, the rotation prevention device prevents rotation of the optical support panel; and
- when in the unlocked state, the rotation prevention device permits rotation of the optical support panel.

3. The support arrangement of claim 2, further comprising a panel mount connected for movement in unison with the optical support panel and wherein:
- when in the locked state, the rotation prevention device engages the panel mount; and
- when in the unlocked state, the rotation prevention device disengages the panel mount.

4. The support arrangement of claim 3, wherein:
- the panel mount includes a support shaft that rotates in unison with the optical support panel when moving between the upright and sideways positions;
- the rotation prevention device includes a brake;
- the brake engages the support shaft when the rotation prevention device is in the locked state; and
- the brake disengages the support shaft when the rotation prevention device is in the unlocked state.

5. A support arrangement for an optical system comprising:

a frame;

an optical support panel that defines a planar mounting surface and is supported in the frame for movement between an upright position and a sideways position, wherein:

the planar mounting surface is oriented in a generally vertical plane when the optical support panel is in the upright position;

the planar mounting surface is oriented in a generally horizontal plane when the optical support panel is in the sideways position;

an array of mounting holes is provided at the planar mounting surface and configured to secure at least one optical device against the planar mounting surface;

when the optical support panel is in the upright position, the at least one optical device extends generally horizontally outwardly from the mounting surface; and when the optical support panel is in the sideways position, the at least one optical device extends generally vertically upwardly from the mounting surface;

a height drive that:

is mounted between the frame and the optical support panel;

is configured to selectively move the optical support panel between a minimum height position and a maximum height position; and includes a linear actuator that can be energized to drive vertical movement of the optical support panel.

6. A support arrangement for an optical system comprising:

a frame;

an optical support panel that defines a planar mounting surface and is supported in the frame for movement between an upright position and a sideways position, wherein:

the planar mounting surface is oriented in a generally vertical plane when the optical support panel is in the upright position;

the planar mounting surface is oriented in a generally horizontal plane when the optical support panel is in the sideways position;

an array of mounting holes is provided at the planar mounting surface and configured to secure at least one optical device against the planar mounting surface;

when the optical support panel is in the upright position, the at least one optical device extends generally horizontally outwardly from the mounting surface;

when the optical support panel is in the sideways position, the at least one optical device extends generally vertically upwardly from the mounting surface; and wherein the optical support panel is mounted to the frame for support from above by a ceiling structure.

7. A support arrangement for an optical system comprising:

a frame;

an optical support panel supported in the frame for movement between an upright position in a generally vertical plane and a sideways position in a generally horizontal plane, the optical support panel including:

a first primary wall that includes:

a first planar mounting surface;

a first array of mounting holes defined by threaded bores that extend into the first planar mounting surface and are configured to receive fasteners that hold at least a first optical device;

a second primary wall parallel to first primary wall spaced from the first primary wall by a distance that corresponds to a thickness dimension of the optical support panel and that includes:

a second planar mounting surface;

a second array of mounting holes defined by threaded bores that extend into the second planar mounting surface and are configured to receive fasteners that hold at least a second optical device;

a height drive that is:

mounted between the frame and the optical support panel; and configured to selectively move the optical support panel between a minimum height position and a maximum height position;

a rotation drive that is:

mounted between the frame and the optical support panel; and configured to selectively rotate the optical support panel between the upright and sideways positions.

* * * * *